Figure 1:
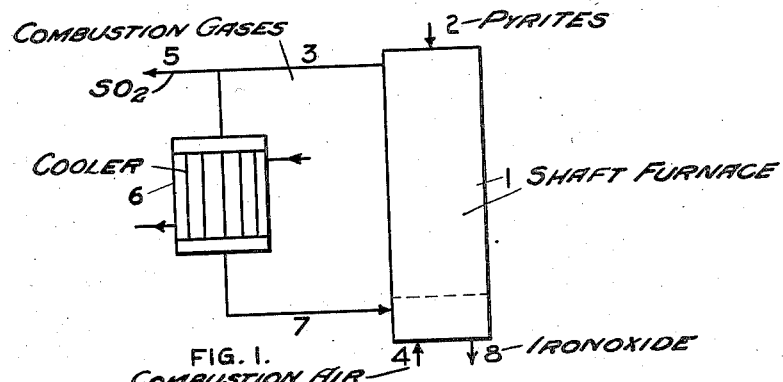

June 23, 1936.   D. TYRER   2,044,960

PRODUCTION OF SULPHUR, SULPHUR DIOXIDE, AND IRON OXIDE

Filed Sept. 15, 1933   4 Sheets-Sheet 3

INVENTOR.
Daniel Tyrer
BY
ATTORNEY.

Patented June 23, 1936

2,044,960

UNITED STATES PATENT OFFICE 2,044,960

PRODUCTION OF SULPHUR, SULPHUR DIOXIDE, AND IRON OXIDE

Daniel Tyrer, Norton-on-Tees, England, assignor to Imperial Chemical Industries Limited, a corporation of Great Britain Application September 15, 1933, Serial No. 689,524 In Great Britain June 16, 1930

8 Claims. (Cl. 23—200)

This invention relates to the production of sulphur, sulphur dioxide and iron oxide, starting from pyrites ($FeS_2$) or ferrous sulphide as a raw material.

As is well known, when pyrites or ferrous sulphide is roasted in air it is oxidized to sulphur dioxide and iron oxide, which is more or less contaminated with residual combined sulphur. In the case of pyrites, which contains a so-called labile sulphur atom, a portion of the combined sulphur may be recovered in the elementary form if the amount of air employed in the roasting is such that insufficient oxygen is present to combine with all of the sulphur. It is also known that it is possible to obtain elementary sulphur and iron oxide by effecting a reaction between ferrous sulphide and sulphur dioxide, but it will be understood that the iron oxide obtained in this way is also heavily contaminated with sulphur.

Up to the present, the roasting of pyrites and of ferrous sulphide has been mainly carried out for the purpose of obtaining sulphur and sulphur dioxide, and the iron oxide has been regarded as a by-product of little or no value on account of its considerable sulphur content.

I have now found that an iron oxide product which is substantially free from sulphur, and which may therefore be employed in the manufacture of iron and steel, may be obtained by roasting pyrites or ferrous sulphide in a counter-current of air and sulphur dioxide in such a way that fusion of the solid material is entirely avoided and the material from which the greater part of the sulphur has been removed is subjected to intense oxidizing conditions by means of air alone in the absence of sulphur dioxide.

I avoid fusion of the solid material by carefully controlling the temperature of the roasting operation by means of introducing into the reaction zone relatively cool gases consisting essentially of sulphur dioxide and nitrogen, with or without small quantities of oxygen, the said gases being obtained from the roasting operation itself. This method of temperature control is already known, but I employ it in conjunction with the step of finally desulphurizing the material by means of air alone, and by this combination I achieve a new industrial process which is characterized by simplicity, economy and flexibility. My process is simple as it may be carried out in a single stage and in standard apparatus, for example shaft furnaces, rotary kilns or mechanical roasting furnaces of various kinds; it is economical as it requires no external source of heat and no reagents other than atmospheric air and the sulphur dioxide obtained in the process itself; it is flexible as it permits ready control of the relative proportions of sulphur and sulphur dioxide which are produced, and it can be operated at varying rates according to the output of products desired at any particular time, the maximum output being very high and of the order of 50 tons of iron oxide per 24 hours for a shaft furnace of 10 feet in diameter. It is essentially a continuous process and can be run for indefinitely long periods without interruption. The necessary controls are simple and readily operated, so that excellent results are obtained with various grades of pyrites or ferrous sulphide.

The avoidance of fusion of the solid material is of great importance, as if even incipient fusion occurs the ferrous sulphide does not effectively react with the gases and the solid product cannot be completely desulphurized. The melting point of pure ferrous sulphide is about 1170° C., but in practice the melting point varies with the quantity of impurities present (i. e. with the grade of the ore) and an average figure is about 950° C. Accordingly the temperature of the roasting operation must be very closely controlled so that the maximum temperature never reaches the melting point. I find that it is advantageous to work as close to the melting point as possible, and in practice temperatures of 800–900° C. or nearly up to the melting point may be used. A sensitive and accurate means of temperature measurement must be provided, preferably at a number of points at different levels within the reaction zone and at a number of points at each level, in order to have ample warning of dangerous rises of temperature and to be able to counteract the same by increasing the rate of introduction of the relatively cool gas.

I will now describe by way of example, the manner in which my invention is applied to the roasting of pyrites in a shaft furnace, and in so doing I will point out the deficiencies of the prior art and the manner in which they are overcome by my invention.

Two cases must be distinguished, according as the pyrites is roasted with excess of air or with a restricted quantity of air.

Case 1. Roasting with excess of air

If pyrites is fed continuously into the upper end of a shaft furnace and is roasted in a counter-current of air which is admitted at the lower end in quantity more than sufficient for complete combustion of the pyrites to iron oxide and sulphur dioxide, then the combustion gases leaving the upper end of the furnace will consist of sulphur dioxide, nitrogen and a certain amount of free oxygen. When steady conditions have been reached the temperature gradient in the furnace is such that the temperature of the solid material increases progressively in the upward direction until a maximum temperature is attained near the top of the charge. The reaction is strongly exothermic and in order to carry off the heat of the reaction and to prevent the charge fusing en masse it is necessary to employ a considerable excess of air, so that only a weak sulphur dioxide gas, for example 7–9 per cent. by volume, can be obtained. It is true that a somewhat richer $SO_2$ gas can be obtained if the temperature in the furnace is controlled in the known manner referred to above, namely by recirculating a portion of the effluent gases and introducing them into the furnace together with the combustion air, which in this case will not be so great in quantity, but if this is done the iron oxide product is heavily contaminated with sulphur. I have found, however, that this objection is removed by introducing part or all of the combustion air separately from the recirculated gas and at a lower level than the latter.

As applied to the case just described in which pyrites or ferrous sulphide is roasted with an excess of air, my invention consists accordingly in a process for the joint production of sulphur dioxide and of iron oxide which is substantially free from sulphur, by roasting the initial sulphide material in a counter-current of air while controlling the temperature of the solid material so as to avoid fusion thereof by feeding to the reaction zone a relatively cool gas consisting essentially of sulphur dioxide and nitrogen, the said gas being obtained by cooling a portion of the effluent roasting gases, and desulphurizing the iron oxide produced in the reaction zone by admitting at least part of the combustion air at a lower level than the said relatively cool gas.

I preferably preheat the combustion air introduced at the lower level in order to still more effectively desulphurize the iron oxide.

*Case 2. Roasting with a restricted quantity of air*

If pyrites is fed continuously into the upper end of a shaft furnace and is roasted in a counter-current of air which is admitted at the lower end in quantity sufficient for the oxidation of the iron but not sufficient for the oxidation of the whole of the sulphur, then the combustion gases issuing from the upper end of the furnace will consist of sulphur dioxide, elementary sulphur and nitrogen, but no free oxygen. When steady conditions have been reached the temperature gradient in the furnace is such that the temperature of the solid material increases progressively in the upward direction until a maximum temperature is attained at the level at which all of the free oxygen has been used up. Above this level no exothermic reaction occurs and the sensible heat of the gases is partly used up in distilling the labile sulphur from the freshly charged pyrites, so that the temperature of the material progressively decreases upwards of the said level. Accordingly, two definite zones are established in the furnace, namely the oxidation zone and the distillation zone. Although the reaction as a whole is not so exothermic as in Case 1, since part of the sulphur content of the pyrites is not oxidized, the quantity of heat evolved in the oxidation zone is such that the tempertaure may rise beyond the melting point of the ferrous sulphide unless the furnace is so designed that some of the heat is dissipated externally. Moreover if an attempt is made to moderate and control the temperature in the oxidation zone by recirculating a portion of the effluent gases and introducing them into the furnace together with the combustion air, it is found that the sulphur in the recirculated gases preferentially combines with the oxygen of the combustion air and accordingly some of the ferrous sulphide is not attacked, so that the iron oxide contains a large proportion of unreacted ferrous sulphide.

I have found, however, that this drawback is overcome if the elementary sulphur is removed from the recirculated gas before introducing it into the furnace, or if the gas for recirculation is withdrawn from the furnace at such a point that it contains substantially no free sulphur or oxygen, i. e. if it is withdrawn from just below the distillation zone. In addition, in order to obtain an iron oxide which is substantially free from sulphur, part or all of the combustion air must be introduced separately from the recirculated gas and at a lower level than the latter. As in Case 1, it is advantageous to preheat the combustion air which is introduced at the lower level.

It is also advantageous to enrich in $SO_2$ the gas which is recirculated. I have found that by enriching this gas to such an extent that the $SO_2$ concentration at or near the top of the oxidation zone in the furnace is maintained at 20 per cent. or more, the reaction between ferrous sulphide and sulphur dioxide takes place so readily that the amount of combustion air can be still further restricted and a much greater proportion of the total sulphur of the pyrites can be obtained in the elementary form. It is even possible to attain the limiting condition in which the amount of combustion air is exactly that required to oxidize the iron content of the pyrites and to obtain substantially the whole of the sulphur in the elementary form, thus obtaining full utilization of the pyrites and at the same time an iron oxide product which is substantially free from sulphur.

The variation of the amount of combustion air enables one to control the relative proportions of sulphur and sulphur dioxide in the effluent gases. When the amount of combustion air approaches the minimum it may be necessary to preheat the air and/or the recirculated gas in order to maintain the necessary temperature in the furnace to ensure the reactions proceeding to completion.

Another way of controlling the relative outputs of sulphur and sulphur dioxide is to roast the pyrites with a restricted quantity of air as already described and to burn a certain proportion of the elementary sulphur in the reaction gases by adding secondary air. Thus the effluent gases from the furnace may be divided into two portions, one of which is treated with secondary air in an auxiliary chamber so as to convert the elementary sulphur to sulphur dioxide. The resulting gas is then cooled and recirculated to the furnace. The secondary air may also be introduced into the upper portion of the roasting furnace, either above the charge or in the distillation zone, in the case where it is desired to oxidize all of the sulphur to sulphur dioxide without admitting all of the combustion air at the lower end of the furnace as in Case 1. The advantage of dividing the air supply into primary and secondary air as just described is that the temperature conditions in the furnace are more stable and more easily controlled. Thus the primary air can be supplied at a constant rate and the secondary air varied in order to compensate for variations in the rate of feed of pyrites or in the sulphur content of the initial pyrites. If desired the secondary air may be preheated.

General

It will be evident from the foregoing that the production of an iron oxide which is substantially free from sulphur depends essentially upon temperature control within the furnace and upon the maintenance of an efficient desulphurizing zone below the oxidation or main reaction zone.

Temperature control implies maintaining the reaction temperature sufficiently high to enable rapid and complete conversion of the ferrous sulphide to be obtained, without at any time allowing the temperature to rise above the melting point of the solid material. The usual range of temperature for the reaction is 800–900° C. and is maintained by suitably regulating the quantity of recirculated gas in relation to the combustion air. As a rule 1–2 volumes of recirculated gas are required per volume of combustion air.

The maintenance of an efficient desulphurizing zone implies a self-supporting reaction between the material to be desulphurized and the combustion air, and for this purpose I have found that the material entering the desulphurizing zone should contain from 12–17 per cent. of sulphur. This sulphur content is sufficient to support combustion but is not high enough to give rise to temperatures such that the material would melt. The combustion air passes in counter-current to the solid material and accordingly the sulphur content of the material is progressively removed until the final material is practically free from sulphur, e. g. it may contain up to 1 per cent. of sulphur. This result is striking when it is considered that the final product of roasting pyrites when introducing a recirculated gas consisting of $SO_2$ and $N_2$ together with the combustion air has a sulphur content of the order of 10 per cent. and the final product of roasting pyrites in ordinary furnaces without temperature control by recirculating gas is also of the order of 10 per cent.

I have found that the desulphurizing of the iron oxide does not require a gas rich in oxygen as might be expected, but that ordinary air is quite satisfactory for the purpose under the conditions already stated. I have also found that the desulphurization is greatly retarded by the presence of any sulphur dioxide in the gas, and this is the reason why I employ air alone. The air is preferably preheated in order to increase the efficiency of the desulphurizing action, and the degree of preheat is varied according to the sulphur content of the material entering the desulphurizing zone. As stated above the sulphur content should be from 12–17 per cent.; if it is less than this the air preheat temperature should be raised in order to make the combustion occurring in the desulphurizing zone self-supporting; if it is more than 17 per cent. the air preheat should be moderated in order to avoid too vigorous combustion leading to fusion of the material.

The preheating of the air may conveniently be effected by passing the air through a jacket surrounding the furnace or by heat exchange with the effluent gases.

In all cases it is desirable to remove the bulk of the dust from any gas which is withdrawn from the furnace for recirculation to the oxidation zone. Preferably such gas is treated for dust removal prior to cooling.

It will be understood that if the recirculated gas contains any free oxygen (5 per cent. by volume will generally be the maximum), due allowance therefore must be made in the quantity of combustion air supplied.

Where more than one furnace is operated at a time the gases for recirculation may be derived from any of the furnaces, or from a common main into which the gases from all of the furnaces are discharged.

I have found that the conversion of ferrous sulphide with sulphur dioxide to form iron oxide and sulphur requires a temperature of about 800–900° C. and a relatively high $SO_2$ concentration. These conditions do not exist in the lowest part of the furnace and even if they were artificially created the conversion of ferrous sulphide would not be complete and the iron oxide product would be heavily contaminated with sulphur. Consequently the amount of combustion air supplied must in all cases be at least equal to that required to convert all of the ferrous sulphide entering the desulphurizing zone into iron oxide and sulphur dioxide.

In order to take advantage of the reaction between ferrous sulphide and sulphur dioxide in the upper part of the furnace, i. e. in the oxidation zone where the temperature conditions are favourable to the conversion, the sulphur dioxide concentration of the gases in this zone must be artificially increased to such an extent that the gases at or near the top of the oxidation zone contain at least 20 per cent. by volume of $SO_2$. The gases obtained by burning ferrous sulphide in air contain at most about 13 per cent. of $SO_2$, and therefore if the effluent gases from the furnace are recirculated to the oxidation zone they must be substantially enriched in $SO_2$ in order to produce the desired effect.

Examples of methods of carrying out my invention will now be given, with reference to the accompanying drawings.

Figure 1 is a line diagram of a roasting furnace operated with an excess of air, the gas for recirculation being withdrawn from the top of the furnace.

Figure 2:
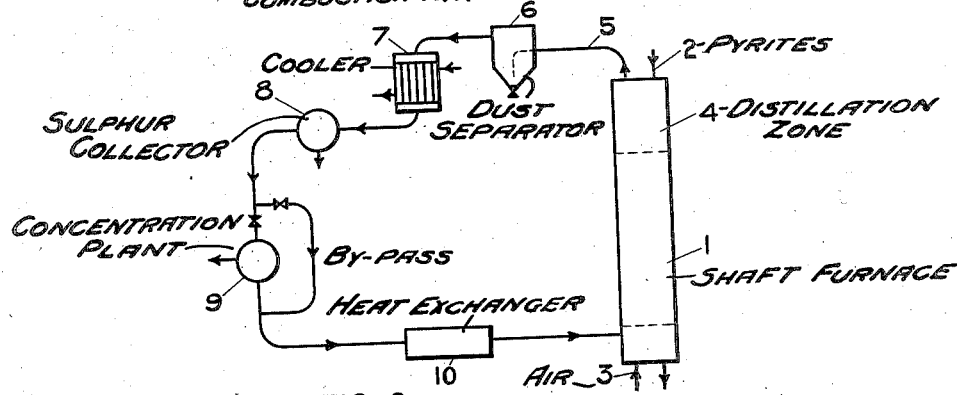
Figures 3, 4:
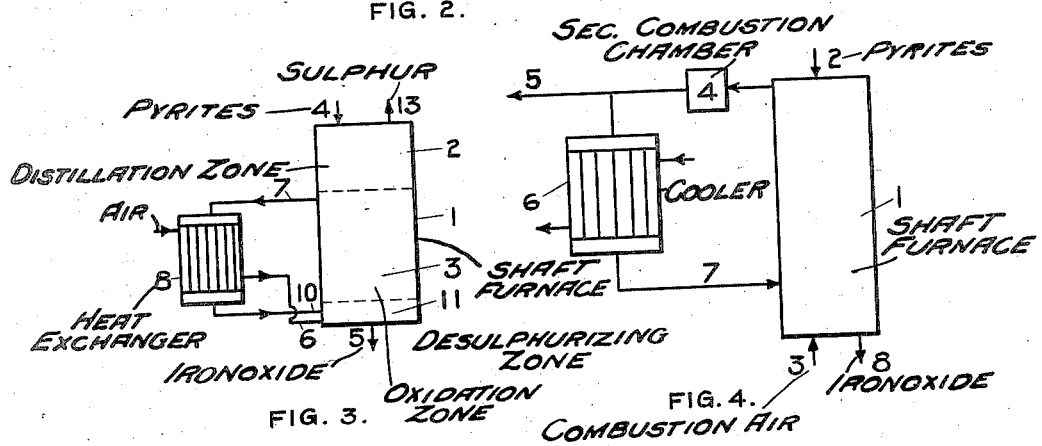

Figures 2 to 4 are line diagrams of roasting furnaces operated with restricted quantities of air. In Fig. 2 the gas for recirculation is withdrawn from the top of the furnace and treated for the removal of dust and sulphur, and is enriched in $SO_2$ prior to introduction into the furnace. In Fig. 3 the gas for recirculation is withdrawn from the furnace at a point such that it contains substantially no free sulphur or oxygen. In Fig. 4 the gas for recirculation is withdrawn from the top of the furnace and is treated with secondary air.

Figure 5:
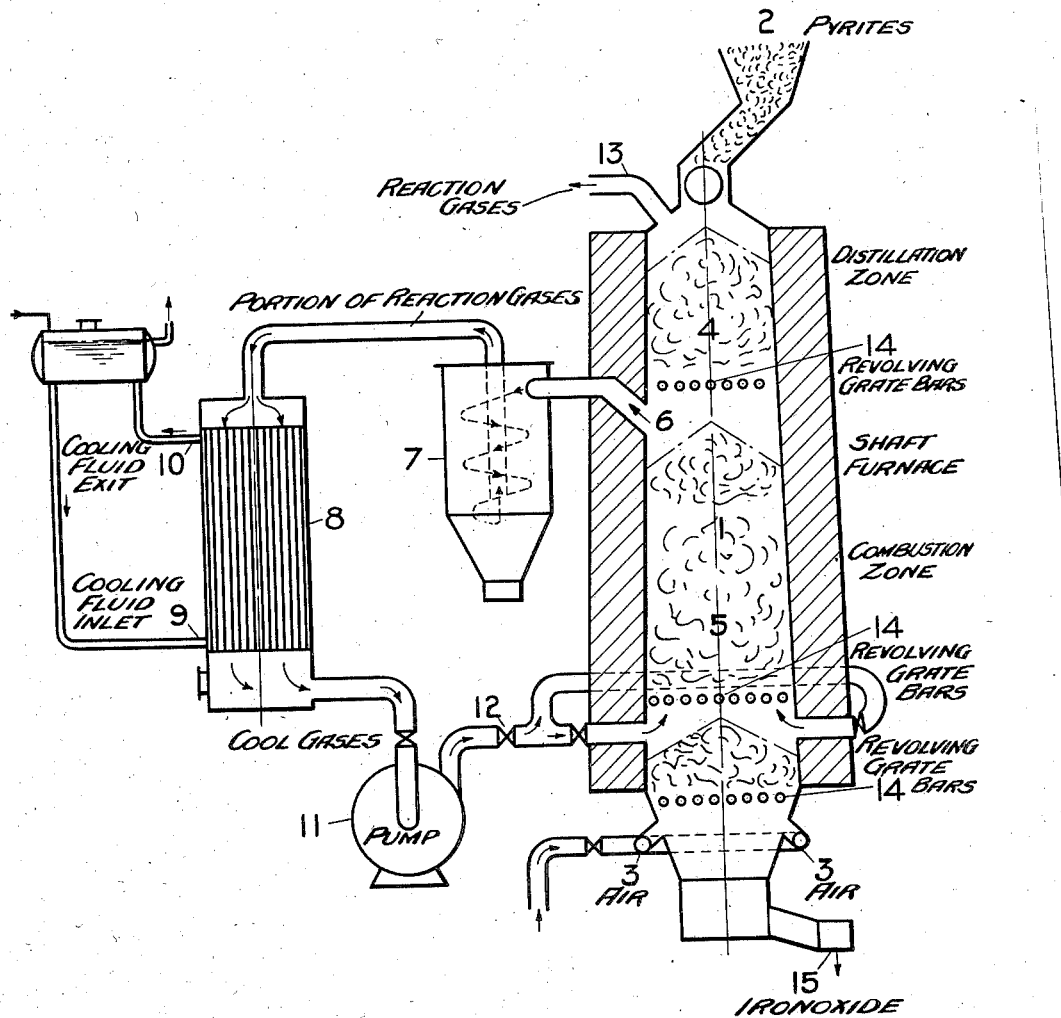
Figure 6:
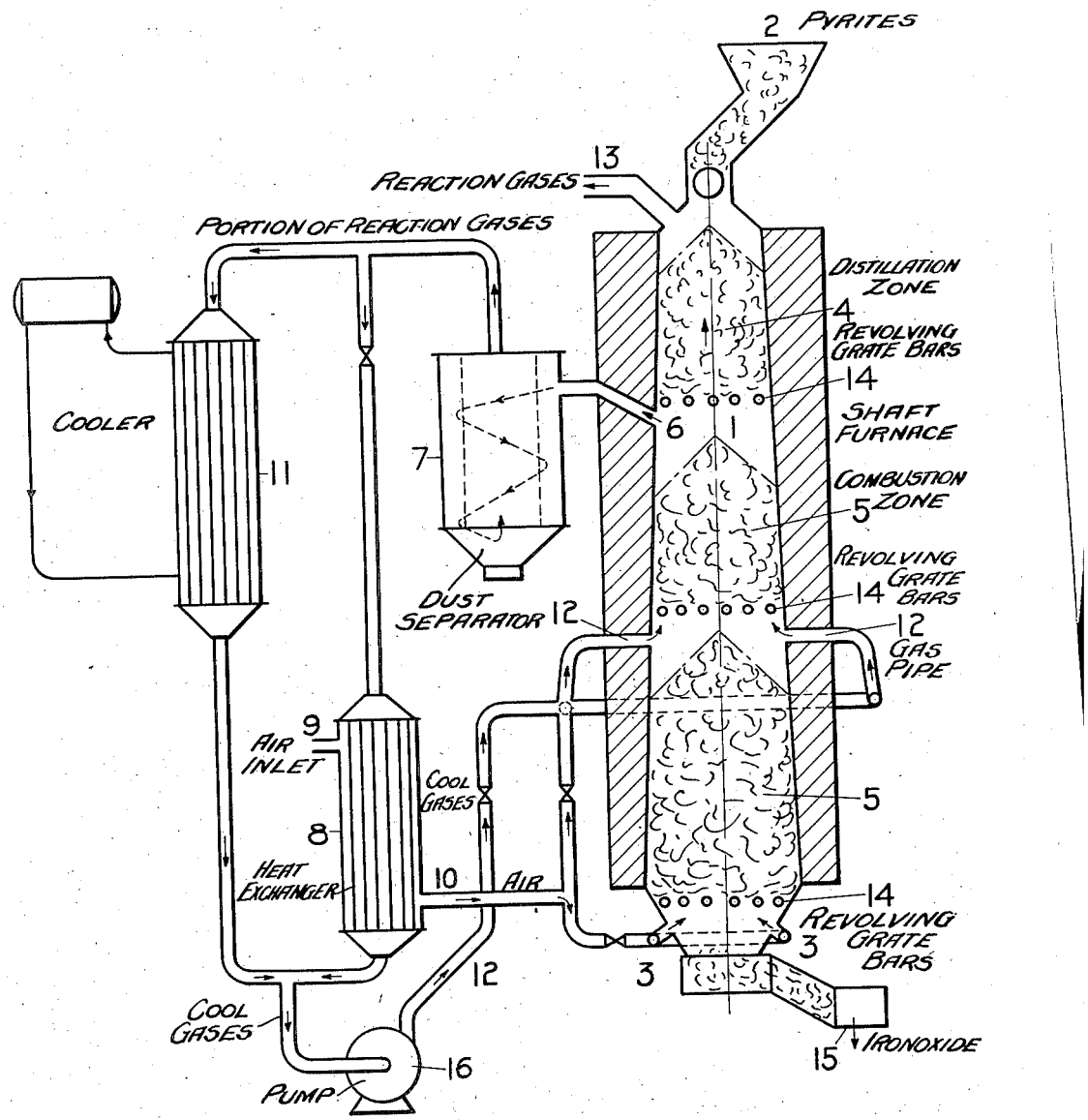
Figure 7:
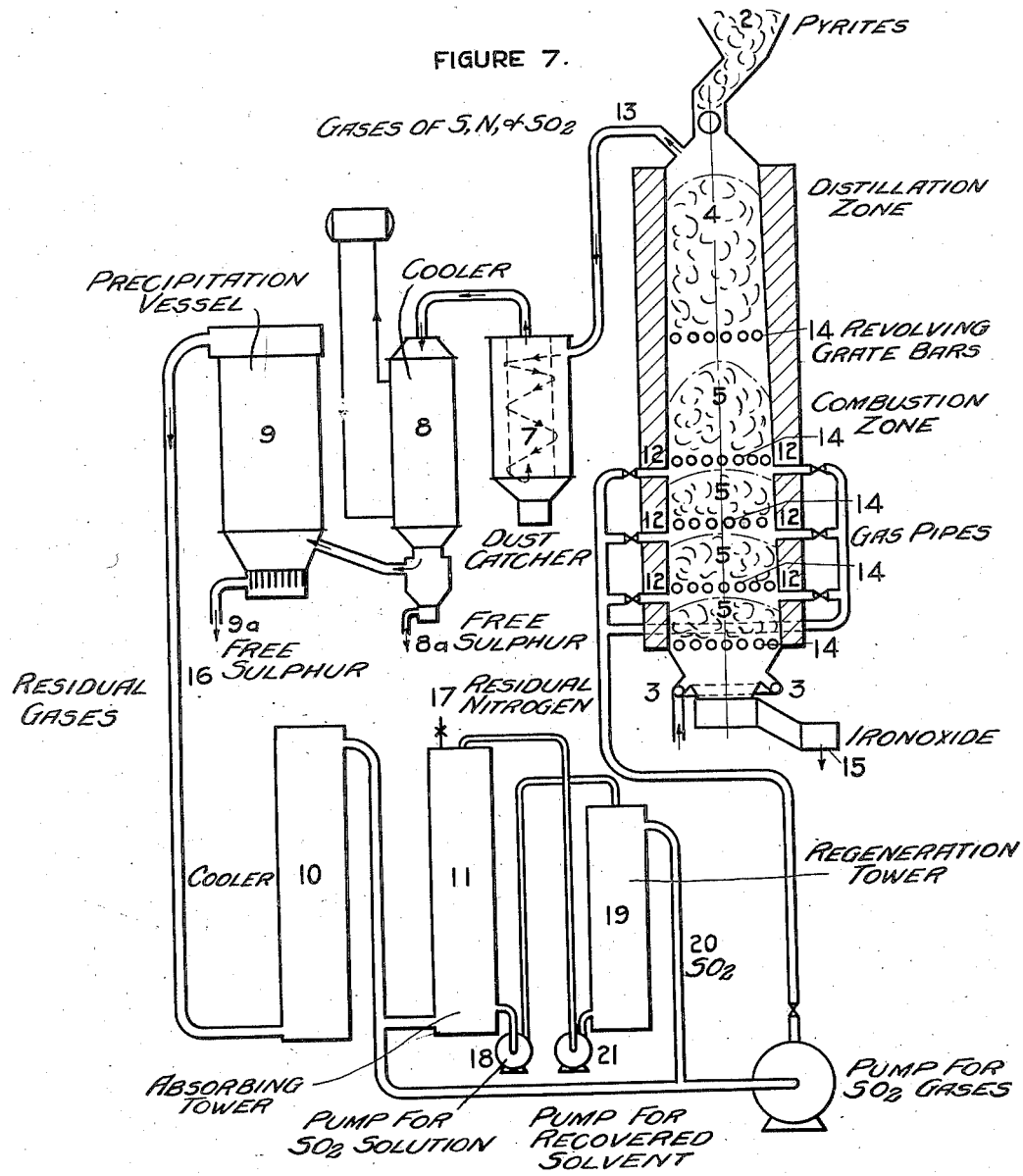

Figures 5 to 7 are elevations, partly in section, of alternative forms of plant comprising a roasting furnace operated with a restricted quantity of air.

Referring to Fig. 1, a shaft furnace 1 is charged with pyrites at 2, combustion air being injected at the base at one or more points 4. The iron oxide is withdrawn at the base of the furnace at 8 and the combustion gases are withdrawn at the top at 3 and recirculated through cooling means 6, which may conveniently be a waste heat boiler, and re-introduced into the shaft furnace at the point 7 which is at a higher lever than the point of introduction of the combustion air. The "make" of sulphur dioxide is withdrawn as indicated at 5. In the operation of this system excess of combustion air is employed in relation to the feed of pyrites so that the gases leaving the burner at 3 consist of sulphur dioxide and nitrogen together with about 5 per cent. of free oxygen and no free sulphur.

Referring to Fig. 2, a shaft furnace 1 is charged with lump pyrites at 2, air being injected at the base of the furnace at 3. The air supply is restricted as hereinbefore described and under these conditions a separate distillation zone 4 is formed in the upper part of the furnace. The gases leaving the top of the furnace are withdrawn as indicated at 5 and are passed firstly to a dust separator 6, then to a cooler 7 and to a sulphur collector 8. The cooler and sulphur collector may suitably be combined into the form of a waste heat boiler fitted with electrostatic precipitation means. The cold gases freed from sulphur are recirculated to the pyrites burner after having been subjected in part or completely to concentration of their sulphur dioxide content in a plant 9. The concentration plant may suitably comprise a washing tower supplied with a solvent to absorb the sulphur dioxide and the said sulphur dioxide is subsequently recovered in a substantially pure state by heating and/or reduction of pressure. The concentration plant 9 may alternatively consist of a liquefaction system in which the sulphur dioxide is prepared in substantially pure liquid form and subsequently allowed to evaporate. A proportion of the dilute sulphur dioxide gas is allowed to by-pass the concentration plant so that the gases recirculated to the burner may be given any desired sulphur dioxide concentration. They are preheated in a heat exchanger 10 and admitted to the furnace at a point below the zone of major combustion but above the point of admission of the combustion air. Under these circumstances the sulphur dioxide concentration in the furnace is sufficiently high to bring about to a considerable extent a reaction between ferrous sulphide and sulphur dioxide and the sulphur content of the pyrites may be recovered entirely in the elementary form, or if desired, partly in this form and partly as sulphur dioxide. It should be understood that the ratio between the sulphur and sulphur dioxide produced is governed by the quantity of combustion air admitted at 3 in relationship to the quantity of pyrites admitted in the same unit of time at 2, and this quantity of air in turn determines the degree of concentration to which the sulphur dioxide gases must be subjected since the amount of nitrogen added with the combustion air must be equal over a period of time to the amount of nitrogen purged away from the concentration plant. Having fixed therefore the rate of feed of pyrites and combustion air and the quantity of nitrogen purged, the temperature of the major combustion zone in the furnace 1 may be controlled by varying the rate at which the gases are recirculated. If desired, in the case where the amount of combustion air admitted is such as would normally lead to the production of both sulphur and sulphur dioxide, the amount of sulphur may be increased at the expense of the sulphur dioxide by adding a reducing agent, e. g. coke, to the upper part of the furnace. Thus a proportion of coke may be mixed with the initial charge of pyrites.

By way of illustration of the invention, a pyrites furnace as described is fed with pyrites at the rate of 318 tons per day and combustion air is supplied at the rate of 7450 cubic metres per hour. The furnace gases are withdrawn having an exit temperature of 550° C. and amounting to 37,200 cubic metres per hour of gas containing 25 per cent. sulphur dioxide, 6 per cent. sulphur vapour and 69 per cent. of nitrogen. After cooling and separation of free sulphur 8,000 cubic metres per hour of the gas, now containing 27 per cent. sulphur dioxide, are treated in the concentration plant from which 5900 cubic metres per hour of waste gases are purged and the concentrated gases are combined with the remainder which are allowed to by-pass the concentration plant. The mixed gas amounts in all to 29,000 cubic metres containing 32 per cent. sulphur dioxide and these gases are preheated to a temperature of the order of 300° C. and recirculated to the furnace. Under these circumstances substantially the whole of the sulphur content of the pyrites is recovered in the elementary form. All the gas quantities mentioned in this paragraph are calculated for the normal temperature and pressure.

Referring to Fig. 3, the gas for recirculation is withdrawn from the furnace through pipe 7 from a point just below the distillation zone 2, where the gas contains little or no free sulphur or oxygen. The gas is passed through a heat exchanger 8 and returned to the furnace via pipe 10 at a point just below the oxidation zone 3. The combustion air is passed in heat exchange with the recirculated gas and is introduced through pipe 6 into the base of the desulphurizing zone 11.

Referring to Fig. 4 combustion air introduced at 3 is less than the quantity theoretically required for the combustion of the pyrites introduced at 2. In this case a separate distillation zone will be set up in the upper part of the shaft furnace and the exit gases will consist of sulphur dioxide and nitrogen and free sulphur. These gases are introduced into a secondary combustion chamber 4 together with sufficient air to burn the sulphur to sulphur dioxide and leave an excess of approximately 5 per cent. of free oxygen.

Referring to Fig. 5 the shaft furnace 1 is charged with lump pyrites at 2 through a gas tight valve. Air is injected at the base of the furnace at one or more points 3. When steady conditions have been attained the upper portion of the shaft 4 acts as a distillation zone for the expulsion of the labile sulphur from the pyrites and the lower portion of the shaft 5 as a combustion zone in which ferrous sulphide is oxidized by means of air. The various zones may be conveniently separated by revolving grate bars 14. The temperature of the combustion zone is controlled by withdrawing a portion of the gases from near the top of the combustion zone by the pipe 6 leading to a dust extractor 7 and heat exchanger 8, e. g. a waste heat boiler, through which cooling fluid passes via inlet 9 and exit 10. The cool gases pass to a pump 11 which forces them via pipe 12 into the lower part of the combustion zone. The air is supplied at 3 and the effluent gases leave at 13. The iron oxide is extracted through gas tight discharge gear 15.

Referring to Fig. 6 the air for combustion is passed through a heat exchanger 8 via inlet 9 and outlet 10 and is heated by a portion of the hot circulation gases from the dust-catcher 7. Alternatively the air may be separately preheated. The remainder of the hot circulation gases are passed through a cooler 11, e. g. a waste heat boiler, to join the gases leaving 8 and the total circulation gas is then passed through a pump 16 which forces them via pipes 12 to the combustion zone of the furnace. The air supply leaving the preheater 8 via pipe 10 may be divided as desired, part being introduced at 3 and part with the cooled circulation gas via pipes 12. The amount of air introduced at 3 will be governed by the sulphur content of the material descending from the major combustion zone.

Referring to Fig. 7 the gases leaving the top of the shaft furnace 1 via the pipe 13 consisting of sulphur dioxide, free sulphur and nitrogen are passed through a dust catcher 7 to a cooler or waste heat boiler 8 and thence to a precipitation vessel 9. Free sulphur is collected in a molten state in any suitable manner at 8a and 9a. The residual gas is then passed via pipe 16 to a cooler 10. A portion of the gases corresponding to the air input to the plant is then by-passed to an absorbing tower 11 where the gas is washed with a suitable solvent for absorbing the sulphur dioxide. The residual nitrogen gas is then purged through pipe 17. The solvent containing the sulphur dioxide absorbed passed from the bottom of tower 11 via pump 18 to a regenerating tower 19 where the sulphur dioxide is driven off in a pure state and is returned, via pipe 20, to the combustion zone of the furnace together with the sulphur-free circulation gas. The regenerated solvent from the bottom of tower 19 is then returned via pump 21 to the top of tower 11 for further use. The total gas returned to the combustion zone for purposes of cooling may be introduced by any of the pipes 12 as desired. Air is introduced through a separate pipe to points at the base of the furnace.

The expression "iron sulphide material" as used in the appended claims includes pyrites (FeS$_2$), ferrous sulphide (FeS) and any other ferruginous material containing a sufficient proportion of sulphur to enable a thermally self-supporting roasting to be effected. The expression "iron oxide substantially free from sulphur" includes iron oxide containing up to about 1 per cent. of sulphur.

Various changes may be made in the manner of carrying out my invention, and it is to be understood that all modifications securing the essential valuable results of my invention are included within the scope of my claims.

This application is a continuation in part of my application Serial No. 542,681, which is a renewal of my original application Serial No. 542,681, filed June 6th, 1931.

I claim:—

1. A process for the joint production of sulphur, sulphur dioxide and iron oxide which is substantially free from sulphur, which comprises roasting an iron sulphide material in counter-current with a restricted quantity of air sufficient for the oxidation of the iron but not sufficient for the oxidation of the whole of the sulphur of said iron sulphide, controlling the temperature of the solid material so as to avoid fusion thereof by feeding to the reaction zone a relatively cool gas consisting essentially of sulphur dioxide and nitrogen, the said gas being obtained by cooling and removing elementary sulphur from a portion of the effluent roasting gases, and desulphurizing the iron oxide produced in the reaction zone by admitting at least part of the combustion air at a lower level than the said relatively cool gas.

2. A process as set forth in claim 1, in which the combustion air introduced at the lower level is preheated.

3. A process as set forth in claim 1, in which the gas obtained by cooling and removing elementary sulphur from a portion of the effluent roasting gases is concentrated in SO$_2$ prior to its introduction into the reaction zone.

4. A process for the joint production of sulphur, sulphur dioxide and iron oxide which is substantially free from sulphur, which comprises roasting an iron sulphide material in counter-current with a restricted quantity of air sufficient for the oxidation of the iron but not sufficient for the oxidation of the whole of the sulphur of said iron sulphide, controlling the temperature of the solid material so as to avoid fusion thereof by feeding to the reaction zone a relatively cool gas consisting essentially of sulphur dioxide and nitrogen, the said gas being obtained by withdrawing a portion of the roasting gases from the furnace at an intermediate depth where the gas contains substantially no free sulphur or oxygen, and desulphurizing the iron oxide produced in the reaction zone by admitting at least part of the combustion air at a lower level than the said relatively cool gas.

5. A process as set forth in claim 4, in which the combustion air introduced at the lower level is preheated.

6. A process as set forth in claim 4, in which the gas withdrawn from the furnace at an intermediate depth is concentrated in SO$_2$ prior to its introduction into the reaction zone.

7. In a process for roasting iron sulphide material in counter-current with a restricted quantity of air sufficient for the oxidation of the iron but not sufficient for the oxidation of the whole of the sulphur of said iron sulphide, treating the effluent roasting gases comprising free sulphur, sulphur dioxide and nitrogen for the recovery of free sulphur, dividing the residual gases into two portions, treating one portion for the production of substantially pure SO$_2$, admixing the said SO$_2$ with the other portion and returning the mixture to the reaction zone to control the temperature therein.

8. In a process for roasting iron sulphide material which comprises passing said iron sulphide material counter-current to a restricted quantity of air sufficient for the oxidation of iron but not sufficient for the oxidation of the whole of the sulphur of said iron sulphide, through a roasting zone, treating the effluent roasting gases comprising free sulphur, sulphur dioxide and nitrogen for the recovery of free sulphur, increasing the SO$_2$ concentration of at least part of the residual gases, and returning the concentrated gas to the reaction zone to control the temperature therein.

DANIEL TYRER.